United States Patent
Smith et al.

(10) Patent No.: US 8,262,968 B2
(45) Date of Patent: Sep. 11, 2012

(54) VEHICLE COMPONENT AND METHOD FOR MAKING A VEHICLE COMPONENT

(75) Inventors: Nels R. Smith, Holland, MI (US); Scott A. Hansen, Holland, MI (US); Jeffrey T. Stout, Grand Rapids, MI (US); Andrew R. Butz, Zeeland, MI (US); Bart W. Fox, Zeeland, MI (US)

(73) Assignee: Johnson Controls Technology Company, Holland, MI (US)

( * ) Notice: Subject to any disclaimer, the term of this patent is extended or adjusted under 35 U.S.C. 154(b) by 746 days.

(21) Appl. No.: 10/585,038

(22) PCT Filed: Jan. 3, 2005

(86) PCT No.: PCT/US2005/000120
§ 371 (c)(1),
(2), (4) Date: Jun. 29, 2006

(87) PCT Pub. No.: WO2005/068154
PCT Pub. Date: Jul. 28, 2005

(65) Prior Publication Data
US 2009/0127738 A1 May 21, 2009

Related U.S. Application Data

(60) Provisional application No. 60/534,314, filed on Jan. 3, 2004.

(51) Int. Cl.
*B29C 45/16* (2006.01)
*B29C 45/33* (2006.01)

(52) U.S. Cl. .............. 264/254; 264/255; 264/328.7

(58) Field of Classification Search .......... 264/254, 264/255, 328.7
See application file for complete search history.

(56) References Cited

U.S. PATENT DOCUMENTS
3,647,587 A * 3/1972 Macdonald ............ 156/71
(Continued)

FOREIGN PATENT DOCUMENTS
EP  0 734 832  10/1996
(Continued)

OTHER PUBLICATIONS
Mizuno, JP 2001-191361 A, Translation.*
(Continued)

*Primary Examiner* — Joseph Del Sole
*Assistant Examiner* — Ryan Ochylski
(74) *Attorney, Agent, or Firm* — Foley & Lardner LLP

(57) ABSTRACT

A molded article with multi-material or color and soft portions and a method of making the same is disclosed. The molded article comprises a multi injection substrate, and a coverstock or skin. The article is formed by a process wherein the coverstock or skin is secured within the mold, a first material is injected into a first cavity, a retractor member is moved to define a second cavity, and a second material is injected into the second cavity. The first and second materials may be different types of plastic, different colors, or combinations thereof. The first cavity is defined by two mold sections (e.g., a cavity and a core) and the retractor member. The second cavity is also defined by the two mold sections, the retractor member, and the (at least partially) hardened first material. The first material may be configured to couple to the second material by a locking interface provided by recesses and/or projections on the mold sections. A method of forming the flexible skin may include coupling a compressible material to the skin; positioning the skin and compressible material in a mold; and forming a rigid substrate around the skin and compressible material providing a first soft region wherein the compressible material is disposed between the skin and the substrate so that a first soft region is defined by the compressible material.

18 Claims, 12 Drawing Sheets

U.S. PATENT DOCUMENTS

| | | | | |
|---|---|---|---|---|
| 5,133,912 | A | * | 7/1992 | Hagiwara et al. ............ 264/46.4 |
| 5,429,786 | A | | 7/1995 | Jogan et al. |
| 5,618,485 | A | * | 4/1997 | Gajewski ...................... 264/255 |
| 5,626,382 | A | | 5/1997 | Johnson et al. |
| 6,004,498 | A | * | 12/1999 | Fujii et al. ..................... 264/255 |
| 6,093,272 | A | * | 7/2000 | Visconti et al. ............... 156/219 |
| 6,248,200 | B1 | * | 6/2001 | Dailey et al. .................. 156/245 |
| 6,827,895 | B1 | * | 12/2004 | Yamamoto ..................... 264/266 |
| 6,838,027 | B2 | | 1/2005 | Brodi, Jr. et al. |
| 2002/0017360 | A1 | * | 2/2002 | Hiraiwa et al. ................ 156/228 |
| 2003/0180498 | A1 | * | 9/2003 | De Winter et al. .............. 428/67 |
| 2005/0082712 | A1 | | 4/2005 | Brodi, Jr. et al. |
| 2006/0068130 | A1 | * | 3/2006 | Dooley et al. ................... 428/31 |
| 2006/0226574 | A1 | * | 10/2006 | Bozio et al. ..................... 264/248 |
| 2008/0073813 | A1 | * | 3/2008 | Smith et al. .................... 264/266 |
| 2008/0157432 | A1 | * | 7/2008 | Boyer ............................ 264/257 |

FOREIGN PATENT DOCUMENTS

| | | |
|---|---|---|
| JP | 10-315241 | 12/1998 |
| JP | 2000-127862 | 5/2000 |
| JP | 2000-210978 | 8/2000 |
| JP | 2001-191361 | 7/2001 |
| JP | 2002-187166 | 7/2002 |
| WO | WO 0209977 A1 * | 2/2002 |

OTHER PUBLICATIONS

Ae et al., JP 2002-187166 A Translation.*
International Search Report for PCT/US2005/000120, date of mailing Apr. 11, 2005, 3 pages.
European Office Action mailed Feb. 26, 2010 in European Patent Application No. 05 704 954.6, 4 pages.
Chinese Decision on Rejection dated Feb. 23, 2011 as received in corresponding Chinese Application No. 200580005251.8, 12 pages.
Chinese Office Action dated Jul. 5, 2008 as received in corresponding Chinese Application No. 200580005251.8 and its English equivalent, 8 pages.
Chinese Office Action dated Jun. 5, 2009 as received in corresponding Chinese Application No. 200580005251.8 and its English equivalent, 10 pages.

* cited by examiner

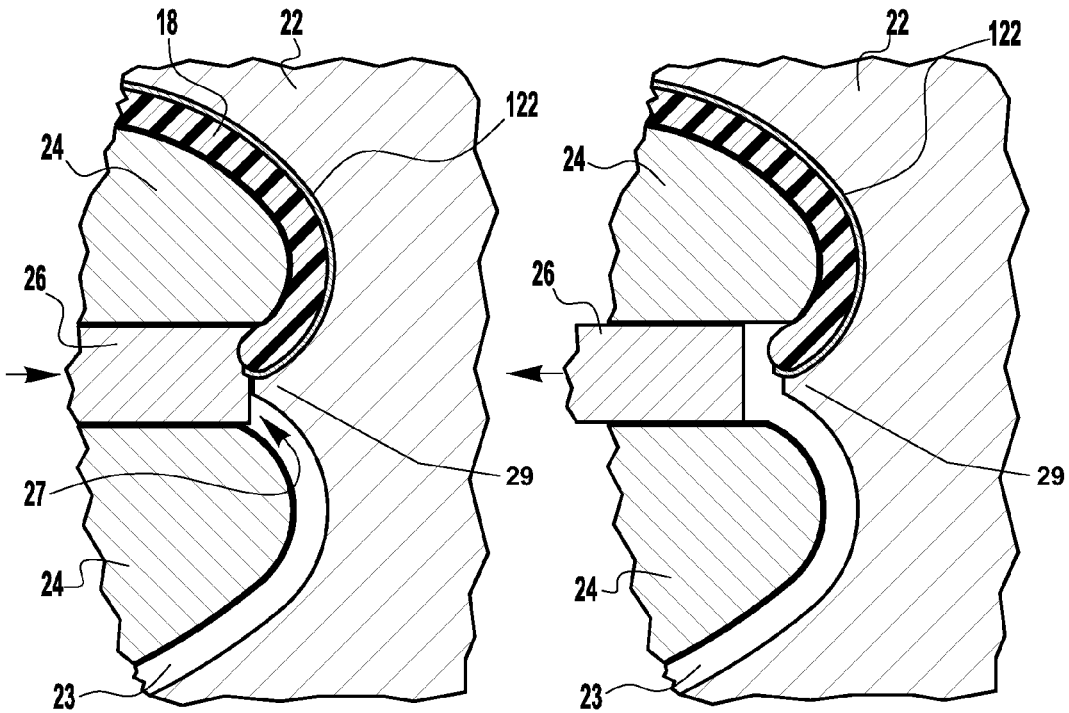
FIG. 6
FIG. 7
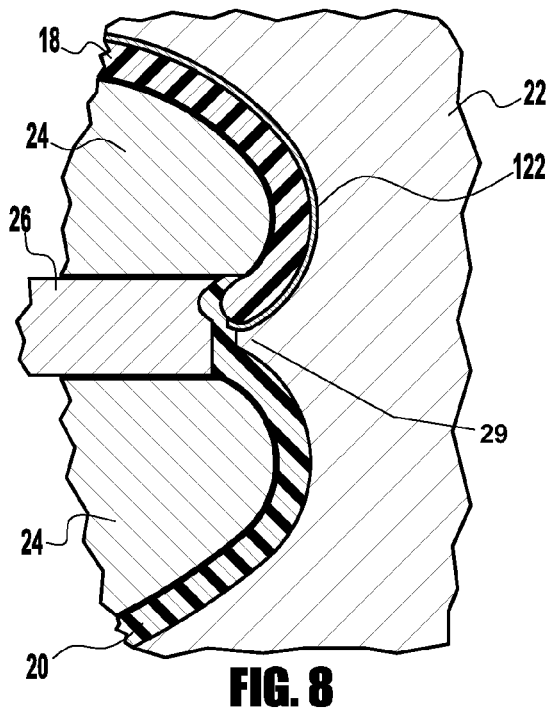
FIG. 8
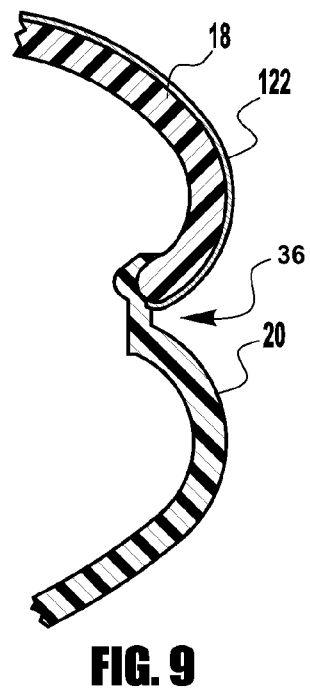
FIG. 9

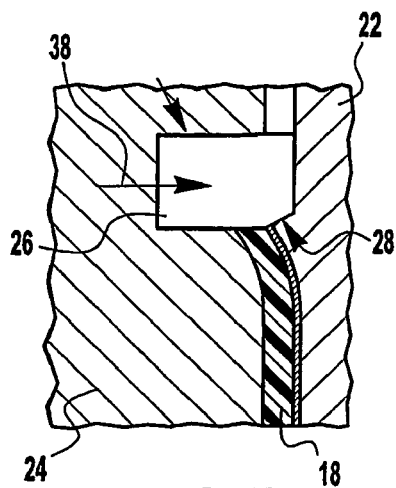 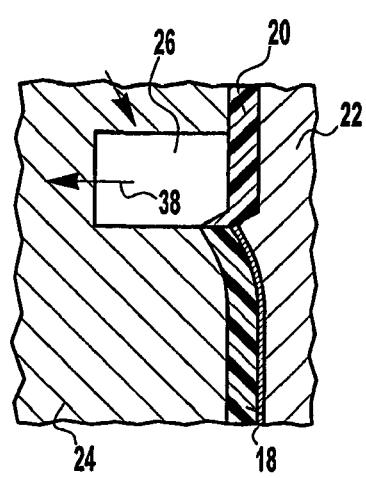 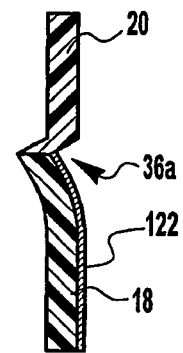
FIG. 10   FIG. 11   FIG. 12
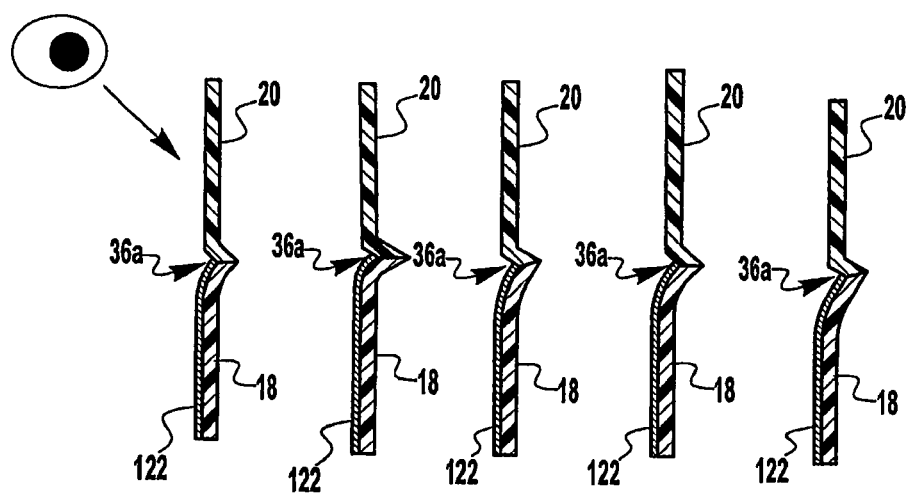
FIG. 13

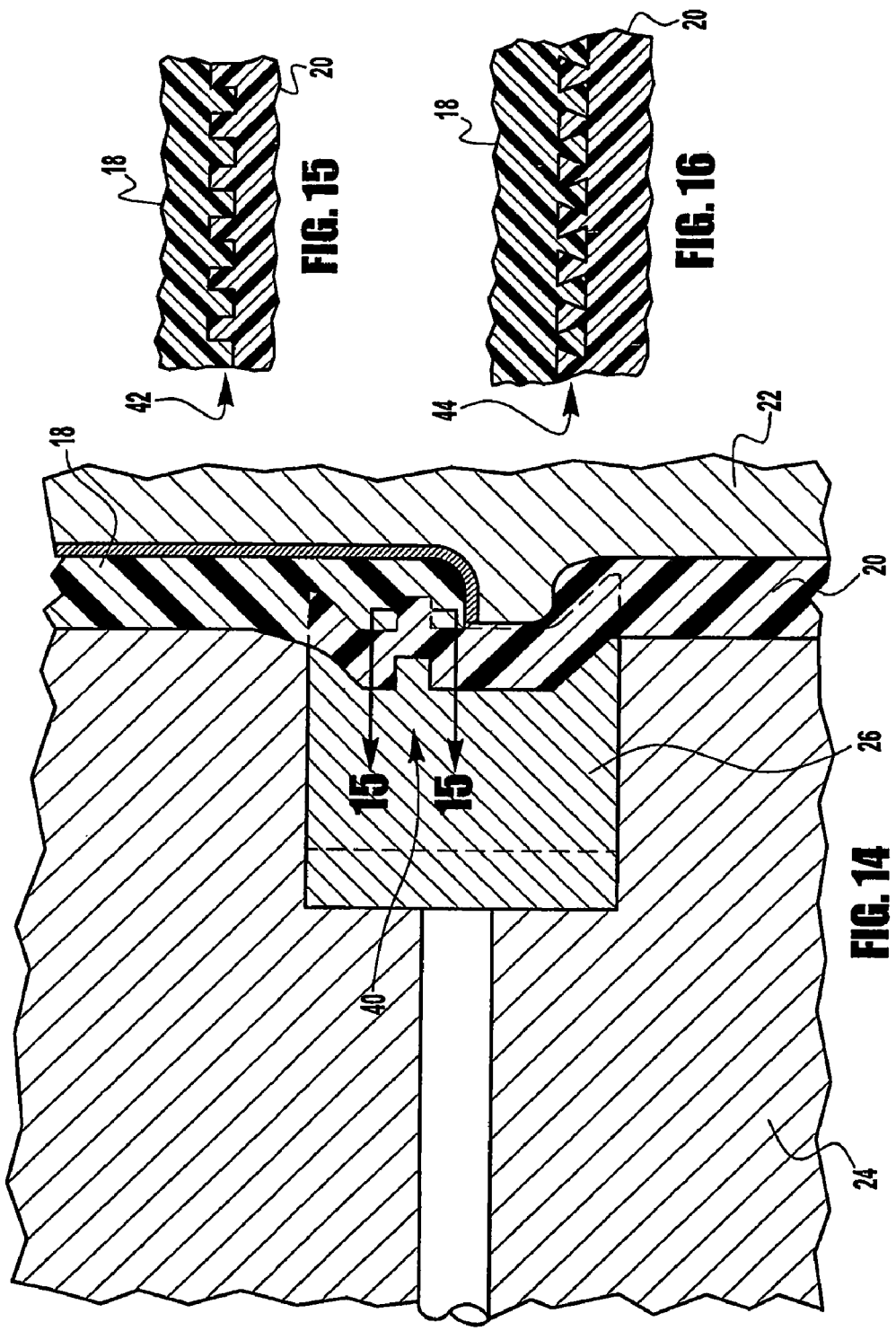

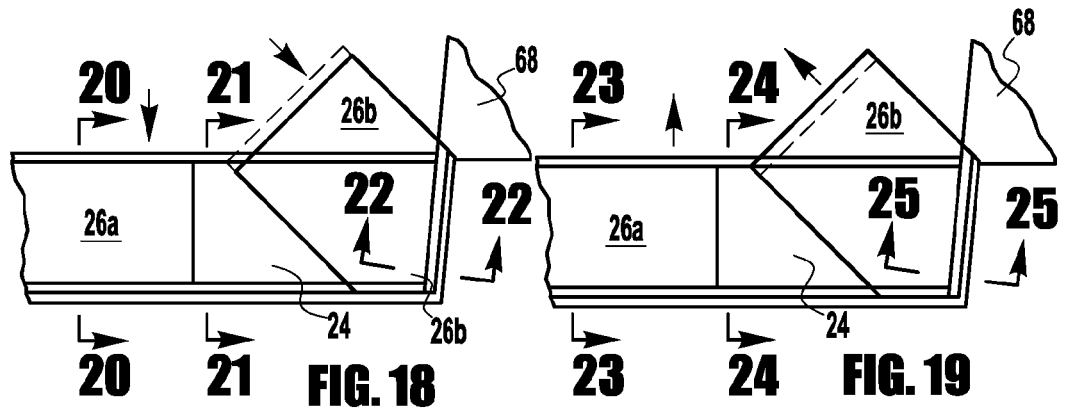
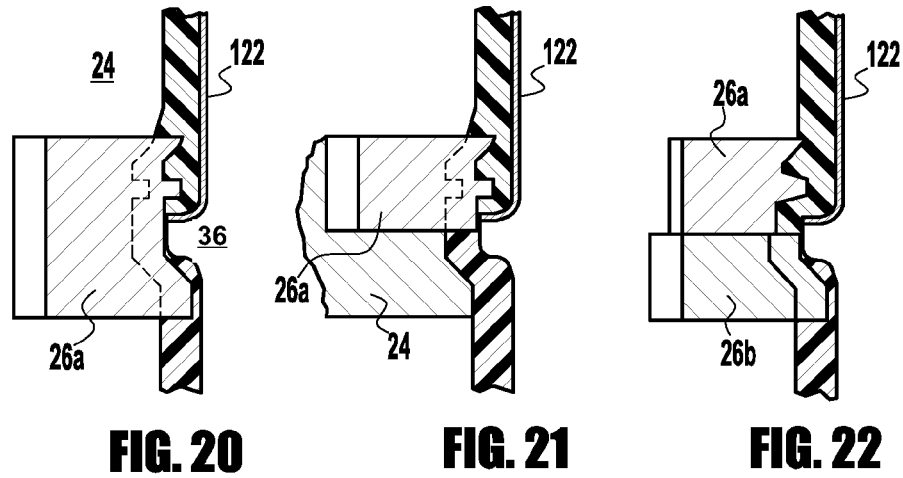
FIG. 20     FIG. 21     FIG. 22
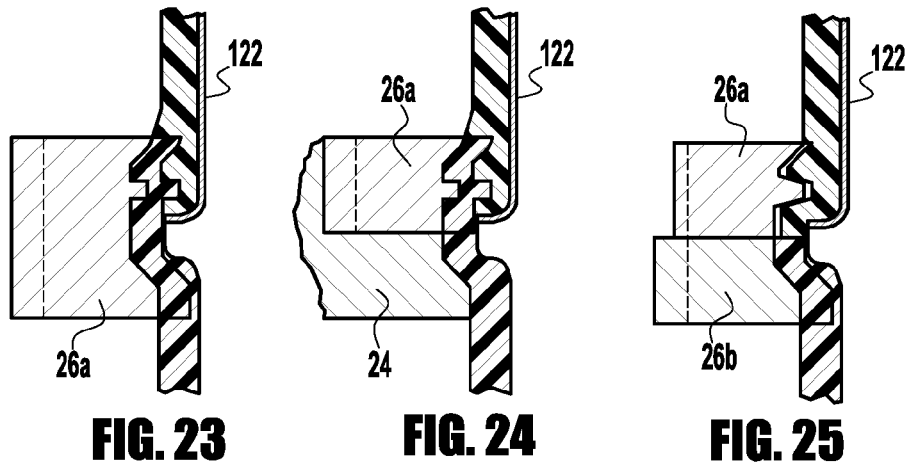
FIG. 23     FIG. 24     FIG. 25

VEHICLE COMPONENT AND METHOD FOR MAKING A VEHICLE COMPONENT

CROSS-REFERENCE TO RELATED PATENT APPLICATIONS

The present application claims priority as a national stage application of International Patent Application Serial No. PCT/US2005/000120 filed on Jan. 3, 2005 and titled VEHICLE COMPONENT AND METHOD FOR MAKING A VEHICLE COMPONENT, which claimed priority to U.S. Provisional Patent Application No. 60/534,314, filed on Jan. 3, 2004 and titled VEHICLE COMPONENT AND METHOD FOR MAKING A VEHICLE COMPONENT, the full disclosures of which is are hereby incorporated herein by reference.

FIELD

The present application relates generally to the field of molded articles or components having at least one relatively soft (e.g., padded or cushioned) region. More particularly, the present invention relates to vehicle trim panels that include at least one relatively cushioned region formed by a partial-mold-behind (PMB) process. The present invention further relates to trim panels made from multiple materials and/or having multiple colors.

BACKGROUND

It is generally known to provide padded or cushioned vehicle interior components. Padded or cushioned vehicle interior components such as trim panels (e.g., instrument panels, door panels, etc.) conventionally include a substrate made of a relatively rigid material, a relatively soft core (e.g.; a foam core), and an outer surface or skin. For example, a vehicle door panel may be cushioned to provide added comfort for an occupant of a vehicle when a portion of the occupant's body interfaces or contacts the door panel.

Various methods of providing such cushioning are known in the art, although such known methods do not provide certain advantageous features and/or combination of features. For example, one difficulty in producing panels having cushioned portions is that it may be difficult to optimize the location of the cushioned portions such that the cushioned portions are provided only in areas that are directly interfaced (e.g., contacted) by an individual. Alternatively, certain areas of vehicle interior trim panels are not contacted by passengers such as locations on a door panel proximate the floor of the vehicle. There may be little or no reason to provide cushioned portions of the door panel in such regions. Further, providing cushioned portions or regions in areas where there is no requirement to do so adds unnecessary expense (i.e., material, labor, and equipment) and may also add excess weight to the vehicle.

To provide localized cushioned portions for interior vehicle components, one known method involves coupling a cushioned component to a rigid component. For example, a relatively rigid panel (e.g., a door panel) may have coupled thereto a component that includes a relatively rigid substrate, a relatively soft skin, and a foam interior portion. One difficulty with such a method is that such method requires the use of additional components (e.g., an additional substrate, bolts or other fastening devices to secure the panel substrate to the substrate of the cushioned portion, etc.), which adds both weight and expense to the finished product.

Accordingly, there is a need to provide a method for producing components such as trim panels or other structures for use in vehicles that includes a relatively soft portion or section. There is also a need to provide components that have regions of localized cushioning that are optimized based on the location likely to be interfaced by a vehicle occupant or other individual. There is also a need to provide a component that has regions of localized cushioning that has a decreased mass and requires less material than conventional components having cushioned regions. There is also a need to provide an integrally formed vehicle component that includes localized regions of cushioning. There is also a need to provide components and a method for making components that may be manufactured in a relatively simple and efficient manner with reduced manufacturing and material costs. There is also a need to provide a manufacturing method for producing components having one or more cushioned portions that utilizes existing equipment.

It is also generally known to provide for a vehicle trim panel comprised of multiple colors or multiple materials by connecting multiple pieces. Such known trim panels are typically joined together into one assembly by conventional methods such as ultrasonically welding, heat staling or mechanical fastening. Another way of producing a multi-colored trim panel is to mask specific regions and paint the desired color.

However, such multi-piece trim panels have several disadvantages including poor fit and finish due to part and assembly variation.

Accordingly, it would be advantageous to provide a molded article that is molded with multiple colors, materials, textures, and the like. It would also be advantageous to provide a vehicle trim component (e.g., door panel, pillar, instrument panel, console, etc.) with multiple colors and/or multiple materials. It would further be advantageous to provide a multi-color/multi-material trim panel that is molded as (one-piece) an article that does not need secondary joining operations and is not masked and painted. It would further be advantageous to provide a one-piece, multi-color/multi-material panel that is aesthetically desirable and creates unique styling opportunities that would not normally be executed due to high cost and poor fit and finish outcomes associated with traditional methods. It would be desirable to provide for a trim panel having one or more of these or other advantageous features. To provide an inexpensive, reliable, and widely adaptable trim panel that avoids the above-referenced and other problems would represent a significant advance in the art.

SUMMARY

The present invention relates to a method of making a vehicle component. The method comprises providing a flexible element; providing a first mold section, a second mold section, and a shut-off member movable between a first position and a second position; providing a first cavity defined by the first mold section, the second mold section, and the shut-off member when in the first position; providing a second cavity defined by the first mold section, the second mold section, the first material, and the shut off member when in the second position; positioning the flexible element within the first cavity or the second cavity; injecting a first resin into the first cavity; moving the shut-off member from the first position to the second position; and injecting a second resin into the second cavity.

The present invention also relates to a trim panel for use in a vehicle. The trim panel comprises a one-piece molded member having a first substrate portion made of a first resin, a second substrate portion made of a second resin, and a cushioned layer at least partially covering one of the first substrate portion and the second substrate portion. The one-piece molded member is formed by a process wherein the cushioned layer is positioned into at least one of a first cavity and a second cavity, the first resin is injected into the first cavity, a retractor member is moved to define a second cavity, and the second resin is injected into the second cavity.

Other embodiments further relates to various features and combinations of features shown and described in the disclosed embodiments.

BRIEF DESCRIPTION OF THE DRAWINGS

FIG. 6 is a schematic side section view of a mold with a slide member in an extended position and resin injected into a first cavity.

FIG. 7 is a schematic side section view of the mold of FIG. 3 with the slide member in a retracted position to define a second cavity.

FIG. 8 is a schematic side section view of the mold of FIG. 3 with the slide member in a retracted position and resin injected into the second cavity.

FIG. 9 is a schematic side section view of an article molded in FIGS. 6-8.

FIG. 10 is a schematic side section view of a mold with a slide member in the extended position and a first shot of polymer material injected into a first cavity.

FIG. 11 is a schematic side section view of a mold with a slide member in the retracted position and a second shot of polymer material injected into a second cavity.

FIG. 12 is a side section view of a plastic article molded as shown in FIGS. 10 and 11.

FIG. 13 is a side section view of plastic articles molded with varying shut-off geometries and angles.

FIG. 14 is a schematic side section view of a mold with a slide member in an extended position.

FIG. 15 is a section view of an interlocking interface of a first molded portion and a second molded portion of FIG. 14 taken along line 15-15.

FIG. 16 is a section view of an interlocking interface of FIG. 14 according to an alternative embodiment.

FIG. 18 is a schematic side section view of a mold with a slide member in a extended position.

FIG. 19 is a schematic side section view of the mold of FIG. 18 with the slide member in a retracted position.

FIG. 20 is a section view of the mold with the extended slide member of FIG. 15 taken along line 20-20.

FIG. 21 is a section view of the mold with the retracted slide member of FIG. 18 taken along line 21-21.

FIG. 22 is a section view of the mold with the extended slide member of FIG. 18 taken along line 22-22.

FIG. 23 is a section view of the mold with the retracted slide member of FIG. 19 taken along line 23-23.

FIG. 24 is a section view of the mold with the extended slide member of FIG. 19 taken along line 24-24.

FIG. 25 is a section view of the mold with the retracted slide member of FIG. 19 taken along line 25-25.

DETAILED DESCRIPTION

Figure 1:
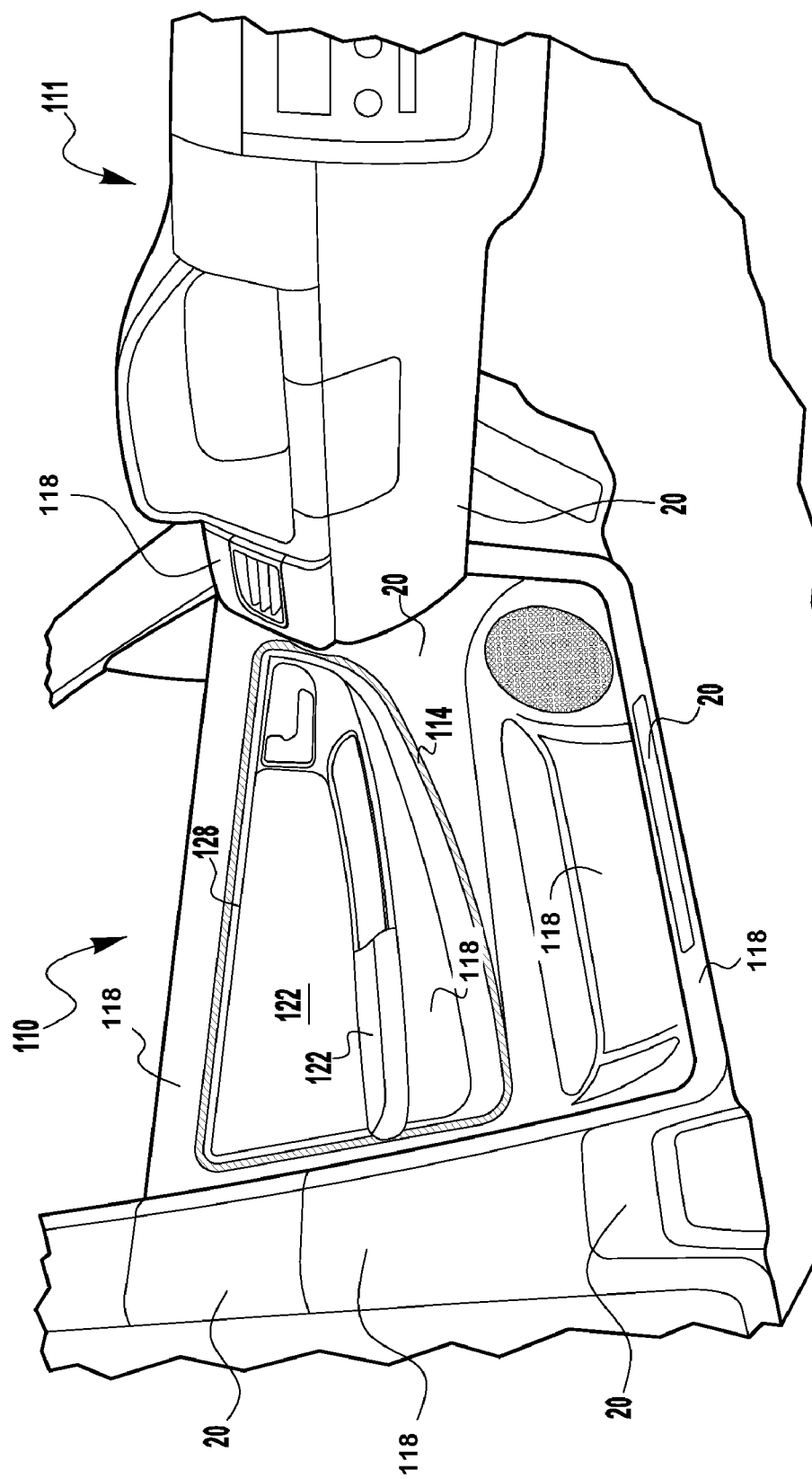
FIG. 1 is a perspective view of a vehicle interior including a door panel and an instrument panel.

Before proceeding to the description of a number of exemplary embodiments of the invention in detail, it is to be understood that the invention is not limited to the details or methodology set forth in the following description or illustrated in the drawings. The invention is capable of other embodiments or being practiced or carried out in various ways. It is also to be understood that the phraseology and terminology employed herein is for purpose of description and should not be regarded as limiting.

In general, the component or molded article described in this disclosure is a molded article having one or more localized or discrete areas or portions of softness or cushioning. In one embodiment, the molded article is configured as a trim panel for use in a vehicle (e.g., automobiles such as cars, trucks, buses, and the like; airplanes, boats, etc.). Providing a trim panel with one or more localized or discrete areas or portions of softness or cushioning enables the trim panel to selectively include areas of softness in areas that are likely to be interfaced by a passenger or other individual without the need to provide cushioning to the entire trim panel. In this manner, the areas of cushioning may be optimized based on the typical passenger experience. One advantageous feature of such a trim panel is that materials and manufacturing costs may be reduced, and the relatively inefficient practice of providing cushioning in areas that are not generally contacted by a passenger may be eliminated.

The molded article described in this disclosure may be employed in a variety of applications, and is generally applicable with any application wherein it would be beneficial to provide a molded article having one or more localized or discrete areas or portions of softness or cushioning. As mentioned above, in one embodiment, the molded article is a trim panel for use in a vehicle. Such trim panels are particularly suitable for use in an interior passenger compartment of a vehicle, and may find utility in the form of door panels, dashboards, instrument panels, consoles, sidewall trim, overhead liners, or other vehicle components or portions thereof. While the disclosed embodiments may be described as a vehicle trim panel, such as a door panel, the features of the disclosed embodiments are equally applicable with other applications such as other panels, molded articles and components and other office, home, or educational, industrial, commercial, or consumer products which employ localized areas or regions of softness.

Proceeding now to descriptions of the preferred and exemplary embodiments, FIG. 1 is a perspective view of a vehicle interior having a door panel 110 and an instrument panel 111.

Figure 2:
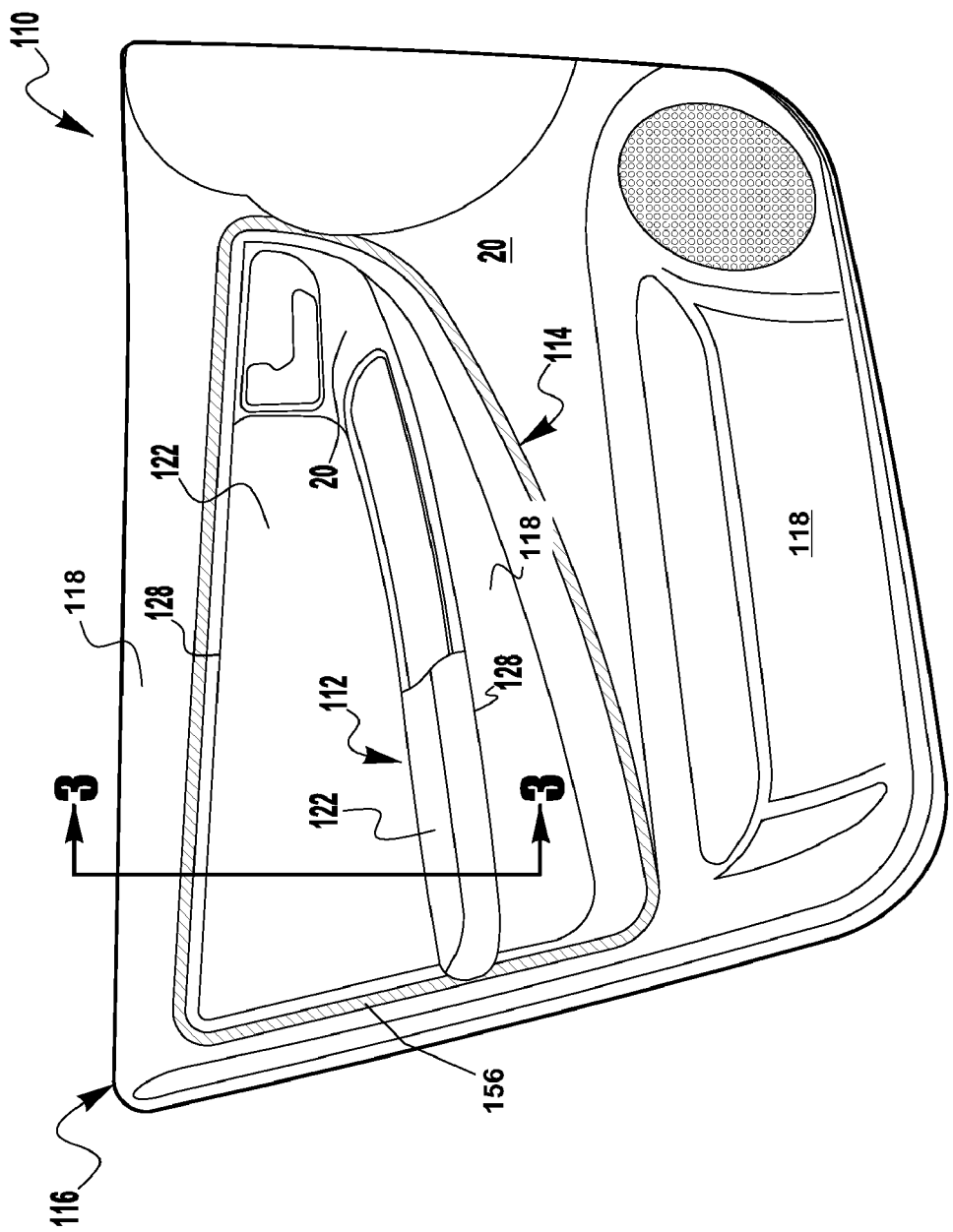
FIG. 2 is a perspective view of a door panel according to an exemplary embodiment.

Referring to FIG. 2, door panel 110 includes localized or discrete areas of softness or cushioning in areas or portions (shown as a relatively "padded" or "compressible" or cushioned layer or region 112) that are likely to be interfaced by a passenger or other individual. For example, door panel 110 includes cushioned regions 112 where a portion of the body of a passenger is likely to contact the door panel (e.g., on an armrest 114, adjacent a window sill 116, etc.) without the need to provide cushioning in the entire door panel. Such a configuration enables areas that are not typically contacted by a passenger, shown as one or more portions 118, to be made of a relatively hard plastic or other material. For descriptions purposes, only door panel 110 will be referred to, but it is understood by a person having ordinary skill in the art that the description also applies to other trim panels such as instrument panels and the like.

The methods of providing localized areas or regions of softness or cushioning in a manner described herein may be utilized to provide molded articles having a wide variety of configurations. For example, door panel 110 may be provided with one or more portions 118 (e.g., areas, regions, islands, etc.) of hard plastic (e.g., bezels, accents, appliqués, pull cups, etc.). In another example, door panel 110 may be formed with complex geometries (e.g., ball armrests, x, y, z boundaries, etc.). In yet another example, door panel 110 may include proud (e.g., raised) or recessed regions of cushioning for enhanced aesthetics.

According to an exemplary embodiment, door panel 110 generally includes a member or element in the form of a relatively rigid substrate, base, or stratum (referred to herein as a "substrate" 120 for simplicity), and the cushioned region 112. Cushioned region 112 is located adjacent or proximate to at least a portion of the substrate 120, and includes a flexible element 121. Flexible element 121 includes a skin 122 (e.g., coverstock, cover material, etc.), and may optionally include a filler or compressible material 124 provided intermediate or between the skin 122 and the substrate 120. It should be noted that according to various exemplary embodiments, all or a part of the substrate 120 may have a cushioned region 112 provided adjacent thereto.

It should further be noted that according to various exemplary embodiments, portions of the skin 122 may be in direct contact with the substrate 120, while other portions of the skin 122 may be separated from the substrate by the compressible material 124. In this manner, selectively varying amounts or degrees of softness or cushioning are provided at one or more localized regions while retaining the look and feel of the skin even in those regions not provided with the additional cushioning of the compressible material 124. According to the particular embodiment illustrated in FIG. 3, cushioned region 112 includes a first region of softness 152 located where skin 122 is in direct contact with the substrate 120, and a second region of softness 154 located where compressible material 124 is provided intermediate skin 122 and substrate 120.

According to an exemplary embodiment, the cushioned region 112 is disposed above or over at least a portion of the substrate 120. The skin 122 forms at least a portion of the exterior surface (e.g., the portion visible from a passenger compartment, which is typically be referred to as the "A" surface, etc.) of the component. According to an exemplary embodiment, a portion 126 of the substrate 120 forms a portion of the exterior surface. A boundary 128 between the substrate and the skin may be provided as a recess 36 (e.g., a seam, interface or joint). Such boundary 128 may be visible at the exterior surface or may be filled in with a material to provide a "seamless" look for the component. Formation and configuration of recess 36 is described further below.

According to an exemplary embodiment, the skin 122 is made of a relatively soft or flexible material comprising a polymeric material (e.g., a thermoplastic olefin (TPO), polyurethane, polyvinylchloride (PVC), etc.). According to other exemplary embodiments, the skin 122 may be made of other materials, including textiles such as cloth, leather, composite materials, layered materials (e.g., a layer of leather applied above a polymeric material layer), etc.

According to a preferred embodiment, the skin 122 is provided on the substrate 120 in such a manner that the compressible material 124 (if any) is located intermediate or between at least a portion of the skin 122 and the substrate 120. According to an exemplary embodiment, portions of the skin 122 may be provided in direct contact with the substrate 120, such that compressible material(s) 124 are located between the skin 122 and the substrate 120 in one or more particular regions. The particular design chosen may depend on any of a variety of factors, including the desired look and feel of the outer surface of the component, materials costs, ease of manufacturing, etc.

According to exemplary embodiments, the skin 122 may be manufactured or produced utilizing any of a variety of process. According to a preferred embodiment, the skin 122 (e.g., a TPO sheet) is thermo formed (e.g., vacuum formed, pressure formed, etc.) and then trimmed to a desired shape or configuration. In a vacuum molding process, a pre-cut or formed sheet of polymeric material is provided in a mold and heated to soften the material. A vacuum is applied to the mold, which draws the softened polymeric material toward the walls of the mold. The polymeric material then cools and maintains the shape defined by the mold walls. The formed sheet may also be trimmed for desired size.

According to an alternative embodiment, the skin 122 is formed by a slush molding process (e.g., thermoplastic material in a liquid or powdered form is introduced into a temperature-controlled mold to form a viscous skin adjacent to the mold walls; once the skin is formed, the excess material is removed from the mold and the skin is allowed to cure and cool, after which the skin is removed from the mold). According to other alternative embodiments, the skin 122 may be manufactured according to various other methods. For example, the skin may be formed in an injection molding process, an extrusion process, a casting process (e.g., gravity casting), or any other suitable process for forming a polymeric skin.

According to an exemplary embodiment in which the skin 122 is made of a polymeric material, the skin has a thickness of between approximately 0.1 and 2.0 millimeters, and most preferably between approximately 0.8 and 1.0 millimeters.

The skin 122 may have a size, shape, and configuration that is adapted or configured to features included in the substrate 120. The size, shape, and configuration of the skin 122 and substrate 120 may have any number of forms, and relatively complex geometries may be formed.

The compressible material 124 may be coupled (e.g., bonded, fused, adhered, fastened, attached, etc.) to the skin 122 and located in between the skin 122 and the substrate 120 to act as a filler. It is intended that such material acts as a relatively soft or cushioning material to provide the cushioned member with at least a portion of its relatively soft or cushioned characteristic. According to a preferred embodiment, the material is a polymeric material such as a foam material (e.g., a urethane foam closed cell foam, on open celled foam, etc.).

The substrate 120 may be made of any suitable material, including any of a variety of polymers (e.g., polypropylene, polyethylene, copolymers, etc.). The substrate 120 may be formed in any of a wide variety of shapes, sizes, and configurations (see, e.g., FIG. 1, which shows the door panel 110 according to an exemplary embodiment having regions of localized cushioning), and may include a variety of other features (e.g., apertures for door locks and handles, molded-in designs, etc.). The substrate 120 may be a stand-alone component or may be a component in a larger assembly (e.g., the substrate may be an entire door panel or may be a portion thereof, etc.). According to an exemplary embodiment, and as explained in detail below, substrate 120 may be made from a process allowing for multiple materials and/or multiple colors to be allocated (positioned, located, molded, placed, etc.) at different portions of the substrate.

Figure 3:
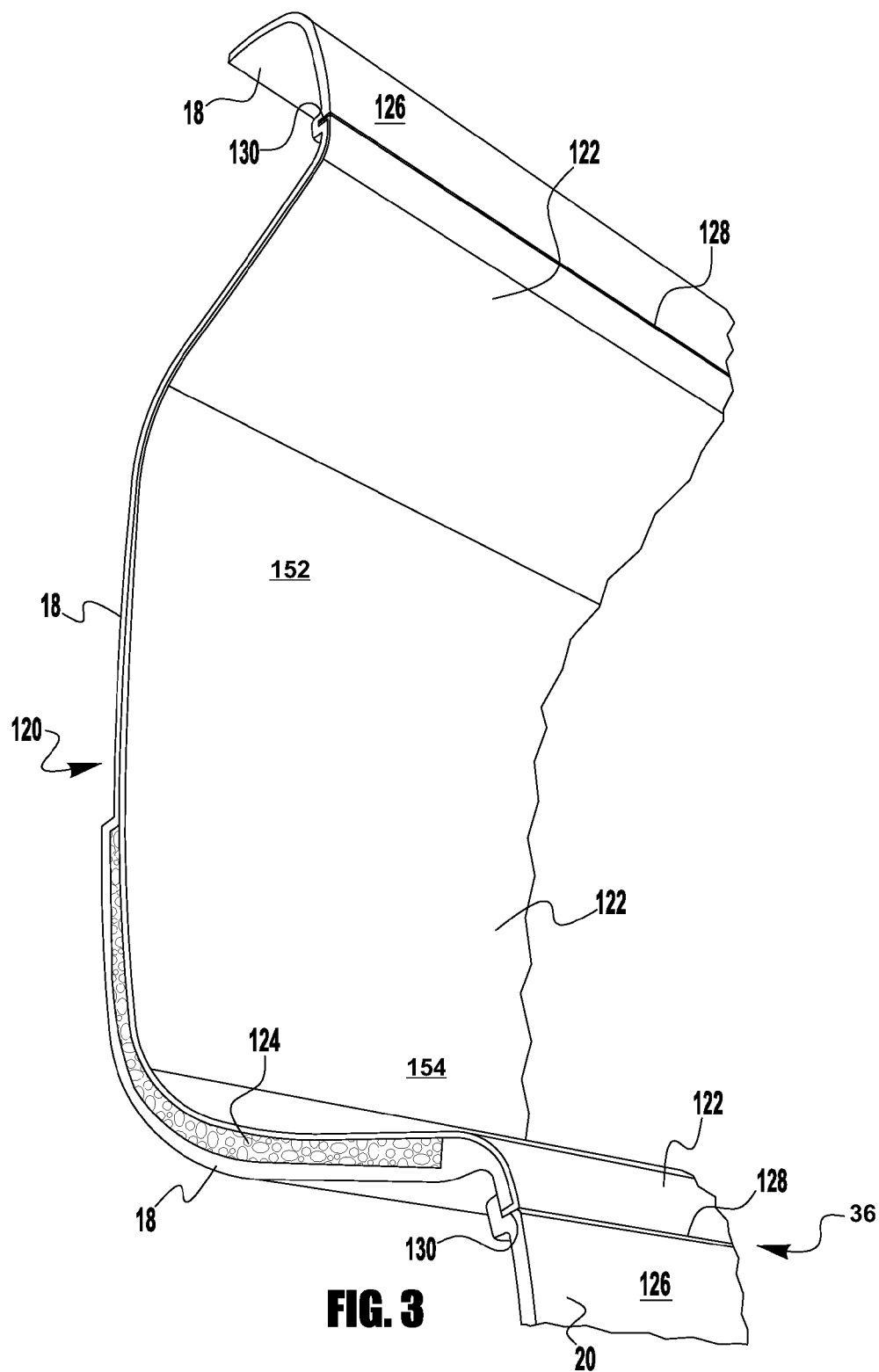
FIG. 3 is a perspective sectional view of the door panel illustrated in FIG. 2 taken along line 3-3.
Figure 5:
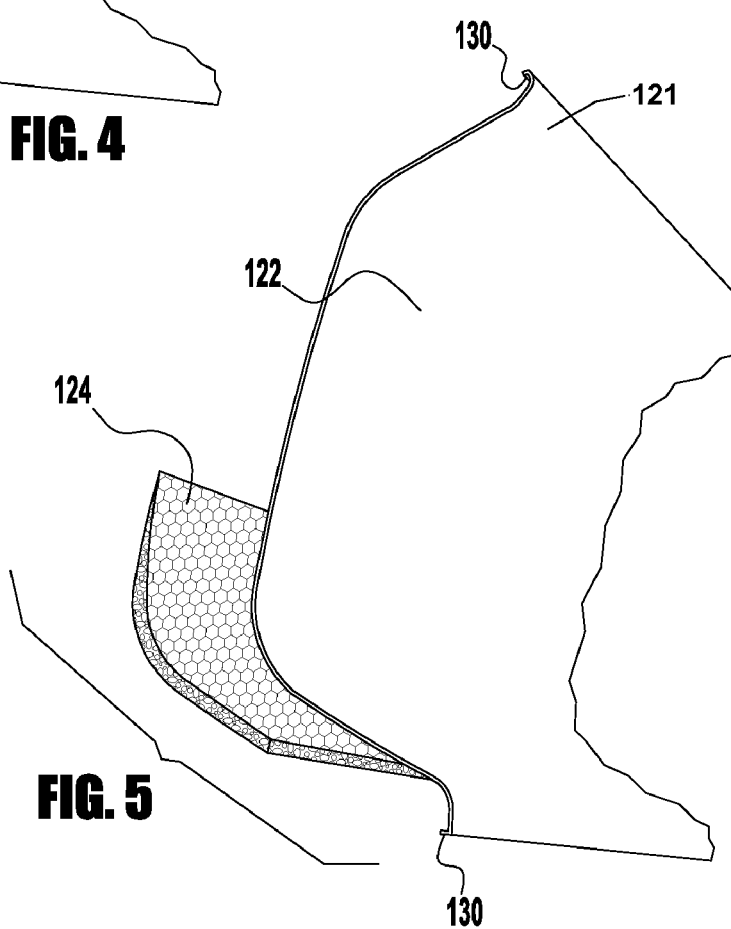
FIG. 5 is an exploded view of the door panel illustrated in FIG. 4.

As shown in FIG. 3, a visual boundary (e.g., a seam or joint) is formed or provided between the skin 122 and the substrate 120, such that the substrate 120 forms a frame around the skin 122. The size, shape, and configuration of the boundary may vary in various exemplary embodiments. The boundary may also be eliminated or reduced in size using a material to at least partially fill in the boundary (e.g., a caulk, adhesive, liquid polymer, or other materials). According to other embodiments, the skin 122 and substrate 120 may be provided in such a manner to minimize the visual boundary. FIG. 5 illustrate one exemplary embodiment showing the coupling between the skin and the substrate.

Figure 4:
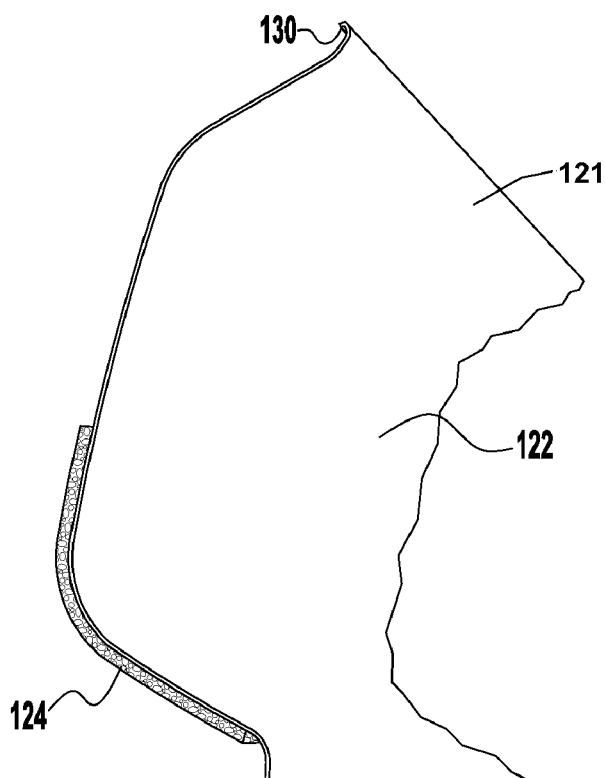
FIG. 4 is a detailed view of the door panel illustrated in FIG. 3.

Any of a variety of configurations may be utilized for the interface of the edges of the skin and the substrate. According to an exemplary embodiment, a flange 130 (shown in FIG. 4) is formed on the skin 122 by forming the vacuum mold (e.g., to provide an edge of the skin with a "folded back" configuration to form a protrusion). The substrate 120 is then molded around the flanges 130 of the skin 122. According to a preferred embodiment, the skin 122 and substrate 120 are coupled together such that a relatively airtight and/or watertight seal is provided. In one example, the skin includes flanges 130 that extends substantially entirely about the periphery of the skin 122 and the substrate 120 is molded around the flanges 130 (e.g., to form a channel or groove that extends substantially entirely about the periphery of the area over which the skin 122 is provided and receive the flanges 130). Various sizes, shapes, and configurations may be used for the protrusion or flanges and the opening or groove to couple the skin 122 to the substrate 120.

According to an exemplary embodiment, door panel 110 is shown with an integrated bolster and armrest. This invention utilizes a die-cut, compressible compressible material 124, such as a die-cut closed cell foam attached (via pressure sensitive adhesives or like processes) to the vac-form skin 122. The part is then placed into a tool and plastic is molded around the assembly to form the substrate 120. Where the compressible compressible material 124 (and the skin 122) is present, there is a soft compressible feel to the part. Where there is no compressible compressible material 124 behind the skin 122, there is a harder feel to the part. Using this innovative process, door trim panels may be manufactured having multiple colors or textures or softness portions.

According to an exemplary embodiment, a method of forming a molded article or component comprises forming a skin 122; coupling a compressible material 124 to the skin 122; positioning the skin 122 and compressible material 124 in a mold; and forming a rigid substrate 120 around the skin 122 and compressible material 124, wherein the compressible material 124 is disposed between the skin 122 and the substrate 120. The method provides for a first region of softness wherein the compressible material 124 is disposed between the skin 122 and the substrate 120 and may include a second region of softness wherein the skin 122 is directly coupled to the substrate 120. The substrate 120 may comprise a molded polymer material. The skin 122 may be formed by vacuum forming and trimming a sheet. The sheet may be thermoplastic olefin. The compressible material 124 may be a foam material, such as a closed cell foam. The foam may be bonded to the skin 122. The skin 122 may comprise a flange 130 and the substrate 120 may be molded to at least partially encapsulate the flange 130. According to an exemplary embodiment, the molded article or component may be a door panel 110. The skin 122 may be first formed, then the compressible material 124 is coupled to the skin 122, then the substrate 120 is molded to the skin 122 and compressible material 124. The step of forming the substrate 120 comprises injection molding a plastic material.

According to one embodiment, the substrate is formed of a single material as a single injection. In another embodiment, the substrate may be formed by a process that allows for multiple materials to be allocated at different portions of the substrate. According to an exemplary embodiment, the process for making such a substrate includes multiple injections into a mold that is reconfigured during the molding operation. It is important to note that the terms "multi-color," "multi-material," "multiple colors," "multi-shot," and "different" polymers (or "plastics," "polymeric materials," "polymeric resins" and the like) as used herein are intended to be broad terms and not terms of limitation. The particular materials used to construct the exemplary embodiments are also illustrative. The resins may be different colors of the same polymer, different polymers that have the same color, different polymers that have different colors, and the like. Any of a variety of materials can be used, including polymers such as thermoplastics, thermosets, elastomers, and the like. For example, any variety of thermoplastic resins such as polypropylene, polyethylene, high density polyethylene, acrylonitrile butadiene styrene ("ABS"), polycarbonate, vinyl, polyester, polyurethane, thermoplastic elastomer (TPE), thermoplastic elastomer polyolefin (TPO), thermoplastic vulcanizate (TPV), polyvinyl chloride (PVC), nylon, any of a variety of homopolymer plastics, copolymer plastics, plastics with special additives, filled plastics, or the like may be used. Also, any of a variety of thermoset resin such as phenolics, thermosetting polyester, silicone, polyurethane elastomers, or the like may be used. Further, any of a variety of elastomer resins such as rubber, butyl, synthetic elastomer (SBR), or the like may be used. There may be one, two, three, or more polymers that are co-molded or sequentially molded. The molding operation is preferably injection molding, but any of a variety of molding operations may be used such as reaction injection molding (RIM), transfer molding or the like. Also, descriptions or claims that identify or recite a "first resin" and a "second resin," a "first polymeric material" and a "second polymeric material," or a "first color" and a "second color" are intended to be broad terms and not limited to one, two, etc. resins, materials, or colors (i.e., cover articles that have three, four, etc. resins, materials, and colors, or combinations thereof).

The method is further shown and described below, but generally uses a multi-shot molding technique (e.g., injection molding, spin molding, transfer molding, over molding, or the like) to produce a one-piece, multi-color/multi-material trim panel. The mold includes a first mold section (shown as a core 24), a second mold section (shown as a cavity 22), and a shut-off member or retractor 26. The first "shot" of polymeric resin material (representative of a first portion 18 of trim panel 110 or 111) is constrained within the mold corresponding to a particular region on the trim panel by a first cavity defined by the retractor 26, core 24, and cavity 22.

Once the first cavity is filled with polymeric resin, the retractor 26 is displaced (preferably by approximately the thickness of the part) to provide a second cavity 23 defined by the displaced retractor 26, cavity 22, core 24, and the first polymeric resin. The second "shot" (representative of a second portion 20 of trim panel 110 or 111) then fills the second cavity with polymeric resin that flows to and bonds with the first material boundary. According to an exemplary embodiment, the second shot is provided by a secondary injection unit. Preferably, the retractor 26 provides the shut-off for the polymeric resin by not contacting the mold such that there is a space or gap between the retractor and the opposing mold section, which is intended to provide a vent to allow air to escape from the first cavity as the resin fills the first cavity. As such, the retractor is not required to actually contact the cavity surface in the first position to stop the flow of material into the second cavity. Instead, depending on the viscosity of the molten resin, the retractor may be offset from (e.g., not in contact with) the second mold section (i.e., the core). As such, the refractor may either shut off against the core or be offset relative to the core. According to a preferred embodiment, the first material is at least partially solidified when the second material is injected.

There are many styling opportunities that can be realized with a multi-shot substrate (i.e., a substrate formed by a process involving multiple injections of plastic into a mold) when compared to a conventional multiple-piece substrate. For example, a two-color color boundary may run (e.g., transition, pass, etc.) through an opening or another component. Isolated color break-ups that make a feature look separate may be realized in the one-piece trim panel such as a different color molded-in speaker grille or map pocket border. Multi-color pillar trim may be provided to allow flow-through from the interior's front to rear without having to break the trim into multiple pieces. Accents in scuff plates and other trim may be produced in the same piece. Part separation does not have to dictate color break-up location. Specific details and features can be highlighted in a different color.

FIG. 1 is a perspective view of instrument panel 111 and door panel 110 according to preferred and exemplary embodiments. Instrument panel 111 and door panel 110 are shown according to a preferred and exemplary embodiments, which show the integration of a two color in one tool injection molded substrate with the addition of partial mold behind soft covering layer (e.g., skin or cover stock). Integration of a two color substrate in one tool injection molded substrate with the addition of partial mold behind (PMB) skin 122 is intended to reduce manufacturing costs, and increase flexibility (e.g., design and manufacturing) and craftsmanship (e.g., less "fitted" components, fasteners, additional manufacturing steps that may reduce quality). The process is intended to be flexible in that the laminate or substrate can be a wide variety of materials, colors, and textures. Also the colors of the injection molded substrate can also be varied without change to the tool. The material injected behind the substrate can also be translucent in nature, allowing for LED or conventional lamps (or any of a variety of light sources) to be located or attached to the rear of the panel to backlight the exposed rim of material (see FIG. 2, border 156). In addition, this process eliminates assembly of various components that can lead to unsightly gaps, buzz squeak and rattle, and other craftsmanship issues.

In contrast, traditional methods of trim panel manufacture would require multiple tools to create the separate hard colors for the substrate and a separate tool to create the bolster with the laminate. Once these pieces are created, there would be an assembly process for joining of the three separate substrates requiring additional capitol, labor, and manufacturing footprint. The disclosed invention combines all of these into one injection molded tool. The skin 122 would be placed into the tool and the tool would close. The first color would be injected behind skin 122 and would form a trim ring around the edge of skin 122 on the "A" side of the part. The second color would then be injected into the tool and would join to the first color. The part would exit the molding machine complete with the ancillary components to be added later. This vastly reduces the molding, capitol, and assembly costs for trim manufacture.

According to an exemplary embodiment, the process of forming the integrated molded trim panel having one or more cushioned regions 112 and a substrate 120 having multiple colors and/or materials is provided in a single mold or tool. The mold includes a core, a cavity, and a retractor. Skin 122 (which may be a pre-formed three dimensional shape, a flat sheet, or the like) is loaded into the mold and located in the first cavity (i.e., one of the color or material regions). The skin 122 may be any of a variety of materials, including but not limited to cloth with a foam backing, PVC with a foam backing, TPO with a foam backing, appliqué material (such as wood metal, etc.) a foil, a cloth without foam, a vinyl without foam, or the like. The skin 122 is held or secured in its location by any of a variety of means (e.g., by its pre-formed shape conforming to the mold, pins, vacuum assist, etc.) The mold is then partially closed in preparation of a low pressure molding operation. The amount of gap provided by the partially closed mold will vary depending on the type of skin being used. (According to an alternative embodiment, the mold is closed entirely.) The interior surface of core 24 forms a recess to at least partially receive a projection 29 extending from cavity 22. Projection 29 may be any of a variety of members extending from the surface of the core (e.g., blade, pins, etc.) and is configured to position and/or retain the end of the coverstock or skin in place.

The molten plastic for the first substrate portion (e.g., the first color, and/or the first material) is then injected or shot behind the cover stock. The mold is then closed completely as the plastic is being injected. The injection of the plastic and closing of the mold is configured to press skin 122 against the mold. The first shot of plastic material is constrained within the mold corresponding to a particular region on the trim panel by a retractor or slider mechanism. The retractor, core, and cavity provide a first cavity.

Once the first cavity is filled with plastic, the retractor is displaced (preferably by approximately the thickness of the part). According to a preferred embodiment, the retractor is displaced to provide a second cavity (defined by the displaced retractor, cavity, core, and the first material). The second shot then fills the second cavity and plastic flows to and bonds with the first material boundary. The mold is then opened and the finished part is removed. According to an exemplary embodiment, the second shot is provided by a secondary injection unit. The retractor provides the shut-off for the plastic by contacting the opposite side of the mold. According to a preferred embodiment, the first material is at least partially solidified when the second material is injected.

Preferably, the portion of the trim panel with the skin 122 is molded first so that the mold is not opened during the operation cycle, though this would be an alterative. The amount of gap left in the partially closed mold will depend on a variety of factors, including the type of cover stock or skin 122 being used, geometry of the part, and the like. According to an alternative embodiment, the first and second materials are the same color and material and the retractor is not used such that both the primary cavity and the secondary cavity are filled at the same time. The process of integrating the multi color of material substrate with the partial mold behind is intended to lower the cost and eliminate the footprint, assembly, capital investment, and increased craftsmanship. The material used for the substrate may be any of a variety of polymers, including but not limited to polypropylene, TPO, filled plastics, polycarbonate ABS blends, ABS, or any of a variety of other materials. For example, different "materials" used in the disclosed method may be different colors of the same plastic resin, configured to provide different textures; and the like. Also, different materials may be different plastic resins of the same or different color. Also, the disclosed process may be used on any of a variety of molded plastic articles, including vehicle components.

The one-piece molded member further comprises an "A" surface (i.e., surface of molded article that is visible to a vehicle occupant) and a "B" surface (i.e., surface of the molded article that is not visible). The "A" surface is generally defined by a portion of the polymeric resin that is injected first, a portion of the polymeric resin that is injected second, and an interface between the two polymeric materials (e.g., at a recess or groove). The portion of the two injected polymeric resins that overlap is generally not visible. The recess is located on the "A" surface. A rigid surface may be provided when portion 18 or portion 20 provides the "A" surface; and a soft or compressible surface may be provided when a skin 122 or a laminate of skin 122 and a filler or compressible material 124 provides the "A" surface.

The retractor that forms part of the shut-off can be perpendicular to or at an angle relative to the direction of the die (mold, tool, etc.) draw. According to an exemplary embodiment (shown in FIGS. 6 through 9), the perpendicular retractor surface is configured to provide a "square" recess (e.g., ditch, indent, etc.) at the two-shot boundary. According to another exemplary embodiment (shown in FIGS. 10 through 13), an angled shut-off 28 (shown as a surface of a retractor 26) is configured to provide an angled recess 36a that is intended to allow the two-shot boundary to be hidden from the occupant's sight for most in-car positions. This angled shut-off 28 creates an apparent geometric gap or transition that may be more desired (for some molded articles) than a square, mechanical recess because it can hide the material joint. Such a configuration may be used to hide the interface between skin 122 and substrate 120, and/or hide the interface between the two-shot boundary.

Referring to FIGS. 14 through 16, to improve the strength of the two-shot boundary, an interlocking geometry can be created to provide a mechanical lock in addition to the chemical bond that exists. According to a preferred embodiment, the molded article includes interlocking geometries and an angled shut-off.

Figure 17:
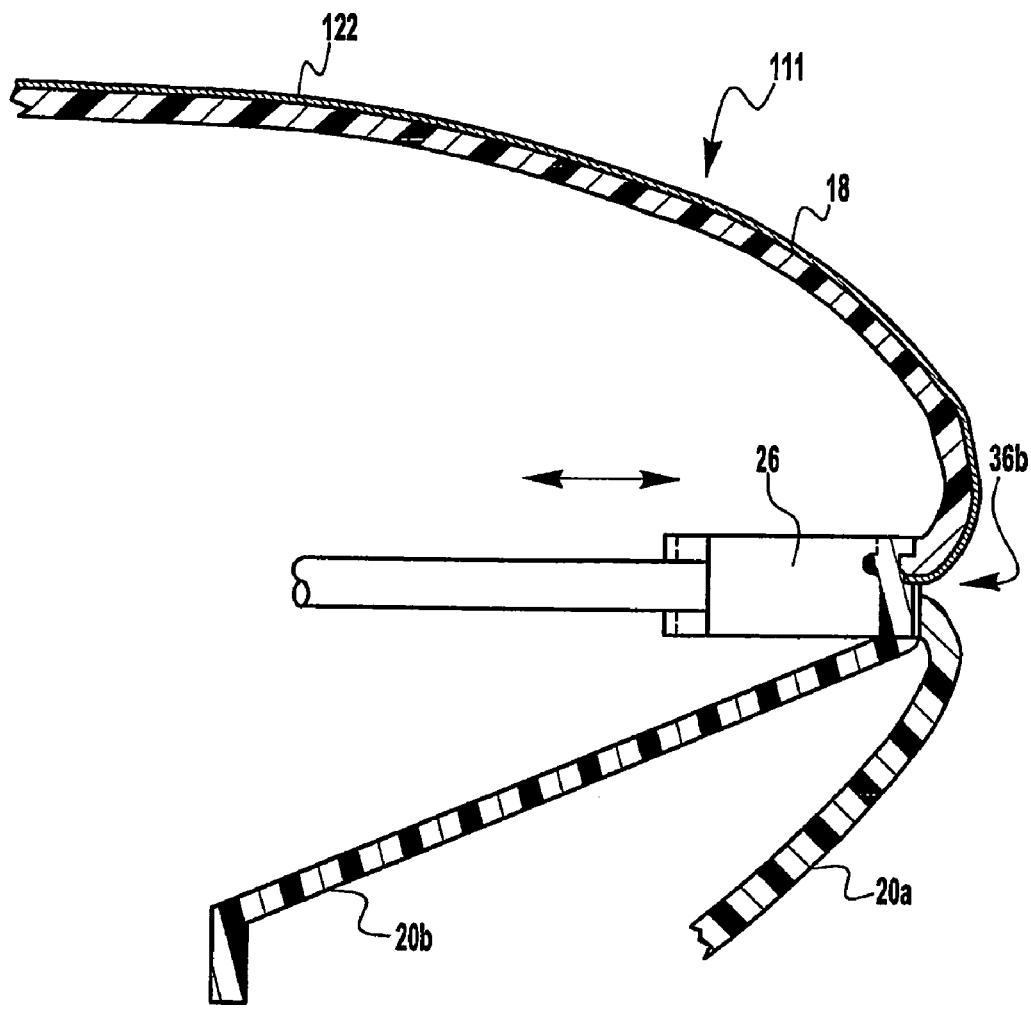
FIG. 17 is a schematic side section view of a mold with a slide member in a retracted position and a molded instrument panel.

FIG. 17 illustrates another exemplary molded article (shown as a portion of an instrument panel 111). The instrument panel 111 includes an upper or first portion 18 molded with a first shot and a second or lower portion 20 molded with a second shot. Skin 122 is disposed in front of upper portion 18. FIG. 17 is a side section view of a vehicle instrument panel 111 with a square recess 36b separating upper portion 18 and lower portion 20. The lower portion 20 of the instrument panel 111 includes a glove box portion 20a (which defines the rear wall of a glove box) and an outboard section 20b (which typically provides a generally flush surface with the glove box door (not shown)). According to an exemplary embodiment, the upper portion 18 of the instrument panel 111 is molded first and then the lower portion of the instrument panel 111 is molded.

The shut-off surface on the retractor (either perpendicular to or at an angle to die draw) is designed to withstand molding pressures and prevent injected plastic from flowing into other areas of the tool. FIGS. 20 through 25 illustrate exemplary cross sections of square and angled two-shot boundary recesses or ditches that could be applied to a molded article (such as a trim panel, instrument panel, etc.). For example, door panel 110 includes a first portion comprising a first color and a second portion comprising a second color. Portions of the trim panel is manufactured using a mold that is reconfigured during the molding operation during a process with shut-off stages so that plastic resin of different colors is injected into the mold at different times.

FIG. 6 shows a fragmentary sectional view of a mold during a molding operation for an instrument panel. According to an exemplary embodiment, the mold includes a first mold section or cavity 22, a second mold section or core 24, and a slide shut-off member or retractor 26. Preferably, the retractor 26 is at least partially disposed in the core 24. Preferably, the "A" surface (or "show surface") of the molded article is provided by the cavity 22 and the "B" surface is provided by core 24. According to alternative embodiments, the retractor is disposed in the cavity and/or the "A" surface is provided by the core. In an exemplary embodiment, the "A" surface (as provided by the substrate as the skin) may be imprinted, molded-in, or stamped with any of a variety of indicia or patterns (e.g., wood grain, etc.).

According to an exemplary embodiment, the retractor 26 is configured to move between a first position and a second position (shown in broken lines) during the molding operation. (According to alternative embodiments, the retractor is configured to move to three or more positions (e.g., a third position, etc.) during the molding operation.) The slide or retractor 26 may be moved using any number of methods, including a spring-loaded and wedge system (so that when the mold sections open, the slide moves back into one of the mold sections), by hydraulics, pneumatics, mechanically, or the like.

The mold shown in FIG. 10 includes a vent 27 between the retractor 26 and the cavity 22. Vent 27 is provided by retractor 26 not shutting off against cavity 22 (i.e., so that the gap or space exists) so that air from the first cavity can escape through vent 27 as the first polymeric resin as injected into the first cavity. According to an alternative embodiment, the retractor may be designed to "shut-off" against the cavity by contacting the mold (i.e., no vent). According to yet another alternative embodiment, the lower portion 20 of the molded article (instrument panel) may be molded first (e.g., by rotating the retractor around, for the geometry shown).

FIGS. 10 and 11 illustrate movement of a retractor 26 to provide for the first cavity and then the second cavity during the molding operation. Referring to FIG. 10, for the first shot 18, the retractor 26 closes-off on the cavity-half of the mold to prevent the first shot from entering into upper portion of tool (shown as the second cavity). The first shot is injected into the first cavity.

Referring to FIG. 11, for the second shot of resin that forms second portion 20, the retractor 26 is pulled back to open the upper portion of the tool and provide the second cavity. Preferably, the retractor 26 moves approximately a wall-stock thickness. The second shot is injected and stops flowing when it reaches the first material. FIG. 12 illustrates the finished part.

Referring to FIG. 13, examples of shut-off geometries are illustrated. The shut-off geometry allows the intersection or interface of the two materials (injections or "shots") to be hidden from view. According to an exemplary embodiment, the shut-off geometry provides for a recess 36a that has outer surfaces that are angled relative to the major surface of the molded part. According to a preferred embodiment, the recess 36a is angled so that interface of the two materials is hidden (e.g., at least partially, substantially, etc.) from the line of site of the vehicle occupants. According to an exemplary embodiment, the angled recess geometry is provided by an angled shut-off surface. Referring to FIG. 11, an arrow 38 illustrates the direction of the draw of the retractor and the mold die.

Referring to FIGS. 14-16, an interlocking geometry is created to provide a mechanical lock in addition to any chemical bond (e.g., fused polymeric resin) that exists to improve the strength of the two-shot boundary. According to a preferred embodiment, the molded article includes interlocking geometries and an angled shut-off. FIG. 14 is a fragmentary side section view of the mold configured to provide a molded article with a mechanical interlock 40. The mechanical interlock 40 is provided by one or more (or a series of) projections and/or recesses on the retractor. FIG. 15 illustrates a section of a square mechanical interlock 42 wherein the projections and/or recesses on the retractor have a square cross-section. FIG. 16 illustrates a section of a dovetail mechanical interlock 44 wherein the projections and/or recesses on the retractor have angled sides (e.g., to provide additional interlock, directional stability). The first shot of resin that forms first portion 18 is, for example, a first color and the second shot of resin that forms second portion 20 is, for example, a second color. As such, the locking direction is vertical.

FIGS. 18 and 19 illustrate a retractor system for allowing vertical walls (parallel to die draw) to be full material thickness (e.g., for use in forming at corners). FIGS. 18 and 19 are a horizontal section of the mold having a core 20, a cavity 22, a first retractor 26a, a second retractor 26b and a secondary slide 68. (Secondary slide 68 is configured to provide, for example, molded-in detail for this particular molded article (i.e., recesses to receive an end cap for an instrument panel)). As shown, use of the second retractor 26b is used to provide additional wall thickness.

Figure 26:
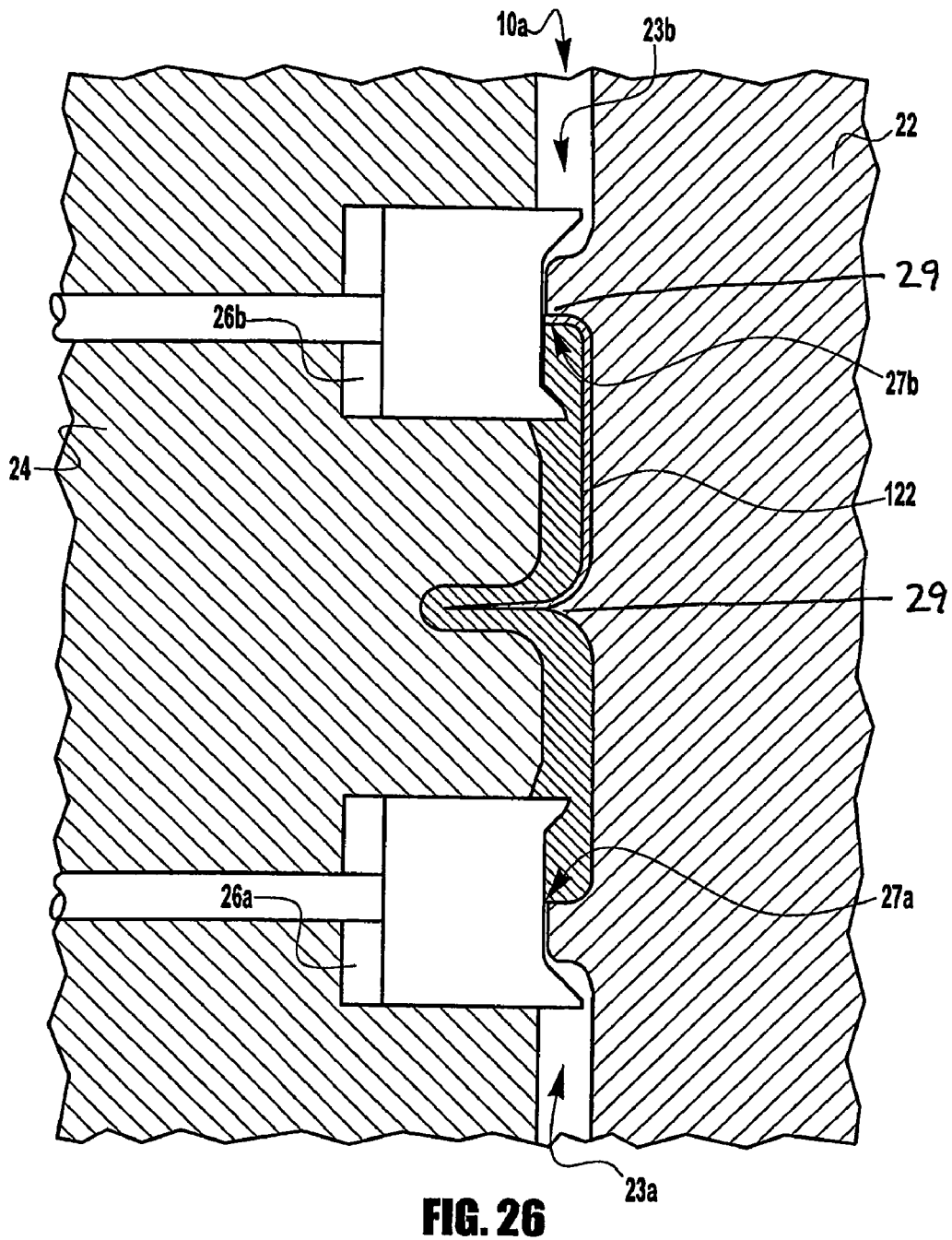
FIG. 26 is a section view of a mold configured to form an article with three materials using two slide members in extended positions and a first polymeric material that has been injected into a first cavity according to an alternative embodiment.
Figure 27:
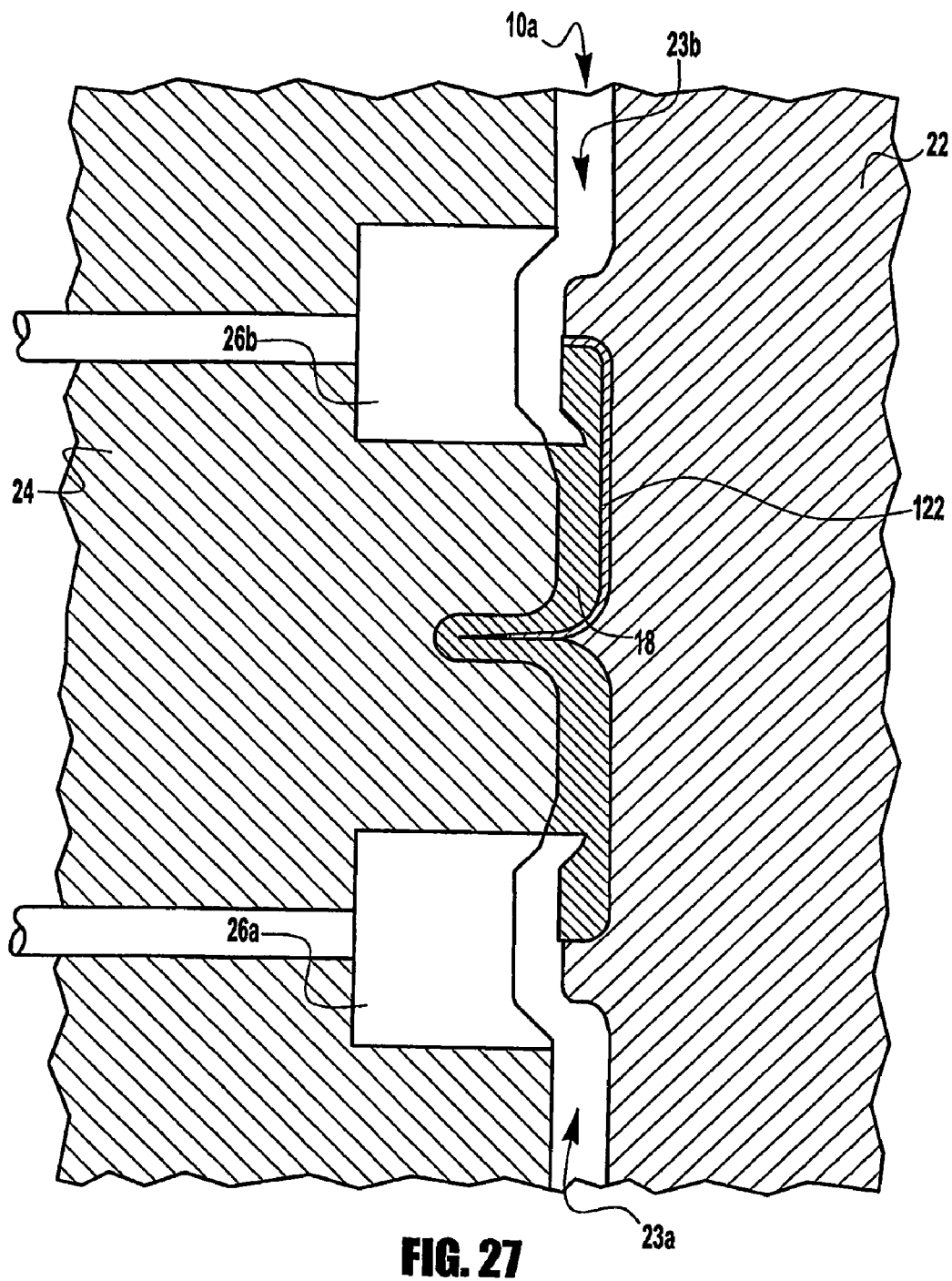
FIG. 27 is a schematic side section view of the mold of FIG. 26 with the slide members in retracted positions.
Figure 28:
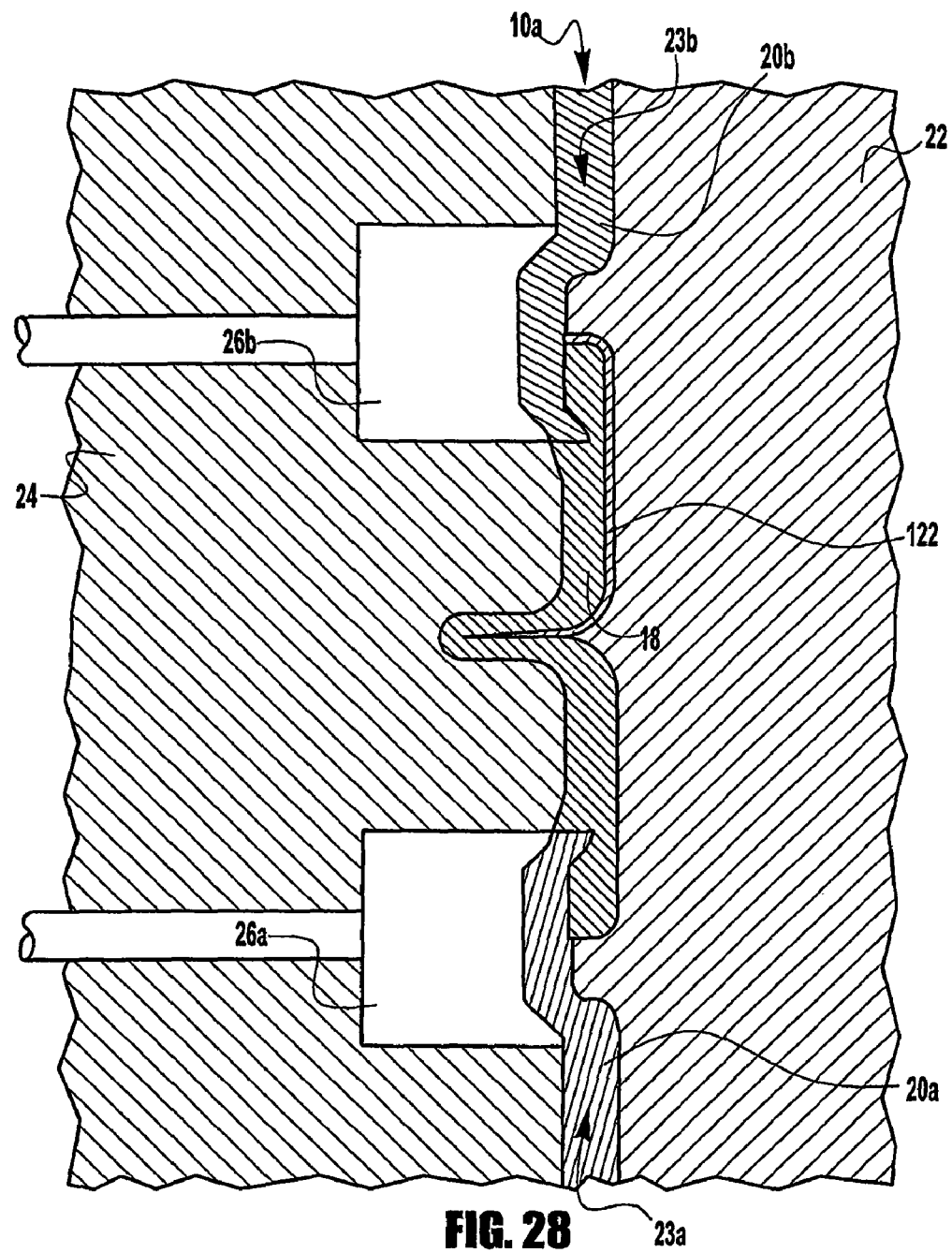
FIG. 28 is a schematic side section view of the mold of FIG. 27 with a second polymeric material injected into a second cavity and a third polymeric material injected into a third cavity.

FIGS. 26-28 show a process for molding a molding article (trim panel 10a) with three resin shots. FIG. 26 is a section view of a mold configured to form an article with three materials using two slide members in extended positions and a first polymeric material injected into a first cavity according to an alternative embodiment. FIG. 27 is a schematic side section view of a mold with the slide members in retracted positions. FIG. 28 is a schematic side section view of a mold with a second polymeric material injected into a second cavity and a third polymeric material injected into a third cavity.

The method uses a multi-shot molding techniques to produce a one-piece, multi-color/multi-material trim panel 10a by integration of the three resin materials into a single substrate. The mold includes a cavity 22, a core 24, a first retractor 26a, and a second retractor 26b.

The skin 122 is held or secured in its location by any of a variety of means (e.g., by its pre-formed shape conforming to the mold, pins, vacuum assist, etc.) The mold is then completely or partially closed in preparation of the molding operation. The interior surface of core 24 forms a recess to at least partially receive a projection 29 extending from cavity 22. Projection 29 may be any of a variety of members extending from the surface of the core (e.g., blade, pins, etc.) and is configured to position and/or retain the end of the coverstock or skin in place.

The first shot of polymeric material 18 (representative of a first portion of trim panel 10a) is constrained within the mold corresponding to a particular region on trim panel 10a by retractors 26a, 26b.

The mold shown in FIG. 26 includes a vent 27a between retractor 26a and cavity 22 and a vent 27b between retractor 26b and cavity 22. According to an alternative embodiment, the retractors may be designed to "shut-off" against the cavity (i.e., no vent).

Once the first cavity is filled with polymer resin 18, first retractor 26a is displaced to provide a second cavity 23a (defined by the displaced first retractor 26a, cavity 22, core 24, and first material 18), and second retractor 26b is displaced (preferably by approximately the thickness of the part) to provide a third cavity 23b (defined by the displaced second retractor 26b, cavity 22, core 24, and first material 18. The first retractor 26a and second retractor 26b are configured to move between a first position and a second position during the molding operation (i.e., the mold is reconfigurable). First retractor 26a and second retractor 26b may be configured to move at the same time or move at separate times. The second polymeric resin 20a and the third polymeric resin 20b may be configured to be injected at the same time or at different times. According to alternative embodiments, the retractors are configured to move to three or more positions (e.g., a third position, etc.) during the molding operation. The retractors may be moved using any number of methods, including a spring-loaded system (so that when the mold sections open, the slide moves back into one of the mold sections), by hydraulics, pneumatics, mechanically, or the like.

The second shot of polymeric material 20a (representative of a second portion of trim panel 10a) then fills the second cavity 23a and polymer flows to and bonds with the first material boundary. The second shot may be provided by a secondary injection unit. According to a preferred embodiment, the first material is at least partially solidified when the second material is injected.

The third shot of polymeric material 20b (representative of a third portion of trim panel 10a) then fills the third cavity 23b and polymer flows to and bonds with the first material boundary. The third shot may be provided by a third injection unit. According to a preferred embodiment, the first material is at least partially solidified when the third material is injected.

Referring to FIGS. 26-28, the process may have any of a variety of sequences. For example, the first retractor 26a may be moved before the second retractor 26b and then the polymeric material may be injected at the same time or one after the other. Alternatively, the first retractor may be moved before (or after) the second retractor and the n the polymeric material may be injected at the same time or one after the other (e.g. before, during, or after the movement of the other retractor).

It is also important to note that the construction and arrangement of the elements of the vehicle trim panel as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. For example, the molded article may have several colors in one part, such as two-tone door look and separately-colored sail panels. Separate parts (e.g., soft-skinned area) can bridge two colors without fit issues. Also, isolated color break-ups (e.g., molded-in speaker grill made to look separate, and map pocket surround) may be used. Further, such a molded article may have part separation requirements that are not dictated by color break-up locations, such as on quarter trim and B-pillar trim of a vehicle. Smaller details that would create fit or masking problems could also be achieved. Small details like cargo hooks or tie-down hook highlights can be molded-in. Further, the molded articles or components may be provided in a wide variety of sizes, shapes, and configurations according to the various exemplary embodiments. The particular materials used to construct the exemplary embodiments are also illustrative. For example, any variety of materials can be used to form the substrate layer, including thermoplastic resins such as polypropylene, high density polyethylene, other polyethylenes, acrylonitrile butadiene styrene ("ABS"), polyurethane, nylon, any of a variety of homopolymer plastics, copolymer plastics, plastics with special additives, filled plastics, etc. Also, it is important to note that the terms "areas of cushioning," "localized areas of softness or cushioning," "multi-color," "multi-shot," "multi-material," and "multiple-colors" are intended to be broad terms and not terms of limitation. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the preferred and other exemplary embodiments without departing from the spirit of the present invention as expressed in the appended claims.

What is claimed is:

1. A method of making a vehicle component, the method comprising:
   providing a first mold section, a second mold section, a first projection extending from the first mold section toward the second mold section, and a first shut-off member opposite the first projection and movable between a first position and a second position, the first shut-off member including a plurality of recesses;
   providing a first cavity defined by a first portion of the first mold section, the first projection, a first portion of the second mold section, and the first shut-off member when in the first position;
   positioning a formed skin in the first cavity proximate the first mold section so that a first edge of the formed skin extends outward past the first projection toward the second mold section such that a free end of the first edge faces the first shut-off member;
   injecting a first resin into the first cavity and bonding to the formed skin;
   moving the first shut-off member from the first position to the second position to provide a second cavity defined by a second portion of the first mold section, a second portion of the second mold section, the first edge of the formed skin that is extended past the first projection, the first resin, and the first shut-off member when in the second position;
   injecting a second resin into the second cavity while the first edge of the formed skin remains extended past the first projection and bonding the second resin to the first resin and the first edge of the formed skin;
   wherein the plurality of recesses in the first-shut off member form a plurality of extensions in the first resin that interlock with a plurality of mating recesses in the second resin;
   wherein one recess of the plurality of recesses of the first shut-off member is configured to receive the first edge of the formed skin.

2. The method of claim 1 further comprising:
   providing a second projection extending from the first mold section;
   wherein the step of positioning the formed skin in the first cavity comprises positioning the formed skin in the first cavity proximate the first mold section so that a first edge of the formed skin extends past the first projection and so that a second edge of the formed skin extends past the second projection;
   wherein the step of injecting the first resin into the first cavity comprises injecting the first resin between the formed skin and the first portion of the second mold section and between the first portion of the first mold section and the first portion of the second mold section so that an outer surface of the vehicle component is provided by the formed skin and by the first resin.

3. The method of claim 2 further comprising:
   providing a third projection extending from the first mold section and a second shut-off member opposite the third projection and movable between a first position and a second position moving the second shut-off member from the first position to the second position to provide a third cavity defined by the third projection, a third portion of the first mold section, a third portion of the second mold section, a portion of the first resin disposed directly between the first mold section and the second mold section, and the second shut-off member when in the second position;
   injecting a third resin into the third cavity and bonding to the first resin.

4. The method of claim 1 wherein the formed skin comprises a flexible sheet and a compressible material coupled to at least a portion of the flexible sheet.

5. The method of claim 1 wherein the formed skin comprises a flexible sheet and a compressible material coupled to a portion of the flexible sheet, and wherein the step of injecting the first resin into the first cavity and bonding to the formed skin comprises injecting the first resin into the first cavity and bonding to the flexible sheet and to the compressible material to provide a first compressible region where the first resin is bonded directly to the skin and a second compressible region where the first resin is bonded directly to the compressible material.

6. The method of claim 1 wherein the first resin is at least partially solidified when the second resin is injected.

7. The method of claim 1 wherein the formed skin is positioned in an area of the vehicle component that may be interfaced by a user.

8. The method of claim 1 wherein the formed skin partially provides an "A" surface of the vehicle component.

9. The method of claim 1 wherein the vehicle component is one of a vehicle door panel or a vehicle instrument panel.

10. A method of making a vehicle component, the method comprising:
    providing a first mold section, a second mold section, a first projection extending from the first mold section, a second projection extending from the first mold section, and a shut-off member opposite the first projection and movable between a first position and a second position, the shut-off member including a plurality of recesses;
    providing a first cavity defined by the first projection, a first portion of the first mold section, a first portion of the second mold section, the second projection, and the first shut-off member when in the first position;

providing a formed skin having a first edge and a second edge;

positioning the formed skin in the first cavity proximate the first mold section between the first projection and the second projection so that the first edge of the formed skin extends outward past the first projection toward the second mold section such that a free end of the first edge faces the first shut-off member;

injecting a first resin into the first cavity and between the formed skin and a first portion of the second mold section and between a first portion of the first mold section and the first portion of the second mold section so that an outer surface of the vehicle component is provided by the formed skin and by the first resin;

moving the first shut-off member from the first position to the second position to provide a second cavity defined by a second portion of the first mold section, a second portion of the second mold section, the first edge of the formed skin that is extended past the first projection, the first resin, and the first shut-off member when in the second position;

injecting a second resin into the second cavity while the first edge of the skin remains extended past the first projection and bonding the second resin to the first resin and the first edge of the formed skin;

wherein the plurality of recesses in the shut off member form a plurality of extensions in the first resin that interlock with a plurality of mating recesses in the second resin;

wherein one recess of the plurality of recesses of the first shut-off member is configured to receive the first edge of the formed skin.

11. The method of claim 10 wherein the step of positioning the formed skin the first cavity provides that the second edge of the formed skin extends past the second projection.

12. The method of claim 10 wherein the first resin comprises a first polymeric material and the second resin comprises a second polymeric material different than the first polymeric material.

13. The method of claim 12 wherein the first resin comprises a first color and the second resin comprises a second color different than the first color.

14. The method of claim 12 wherein the first polymeric material comprises a first color and the second polymeric material comprises a second color which is approximately the same as the first color.

15. The method of claim 10 wherein the first resin comprises a first polymeric material and the second resin comprises a second polymeric material which is the same as the first polymeric material.

16. The method of claim 15 wherein the first polymeric material comprises a first color and the second polymeric material comprises a second color different than the first color.

17. A method of making a vehicle component, the method comprising:

providing a first mold section, a second mold section, a first projection extending from the first mold section, a second projection extending from the first mold section, a third projection extending from the first mold section, a first shut-off member opposite the first projection and movable between a first position and a second position, and a second shut-off member opposite the third projection and movable between a first position and a second position, at least one of the first and second shut-off members having a plurality of recesses;

providing a first cavity defined by the first projection, a first portion of the first mold section, a first portion of the second mold section, the second projection, the first shut-off member when in the first position, and the second shut-off member when in the first position;

providing a formed skin having a first edge and a second edge;

positioning the formed skin in the first cavity proximate the first mold section between the first projection and the second projection so that the first edge of the formed skin extends outward past the first projection toward the second mold section such that a free end of the first edge faces the first shut-off member and so that the second edge of the formed skin extends past the second projection;

injecting a first resin into the first cavity and between the formed skin and a first portion of the second mold section and between a first portion of the first mold section and the first portion of the second mold section so that an outer surface of the vehicle component is provided by the formed skin and by the first resin;

moving the first shut-off member from the first position to the second position to provide a second cavity defined by a second portion of the first mold section, a second portion of the second mold section, the first edge of the formed skin that is extended past the first projection, the first resin, and the first shut-off member when in the second position;

injecting a second resin into the second cavity while the first edge of the formed skin remains extended past the first projection and bonding the second resin to the first resin and the first edge of the formed skin;

moving the second shut-off member from the first position to the second position to provide a third cavity defined by a third portion of the first mold section, a third portion of the second mold section, a portion of the first resin disposed between the first mold section and the second mold section, and the second shut-off member when in the second position;

injecting a third resin into the third cavity so that a portion of the third resin bonds to the first resin;

wherein the plurality of recesses in one of the first and second shut off members form a plurality of extensions in the first resin that interlock with a plurality of mating recesses in at least one of the second and third resins;

wherein one recess of the plurality of recesses in one of the first and second shut-off members is configured to receive at least one of the first and second edges of the formed skin.

18. The method of claim 17 wherein the second shut-off member comprises a forward surface, a first side surface, a second side surface that shares an edge with the forward surface, and an angled surface that extends between the forward surface and the first side surface; and wherein the step of injecting a third resin comprises forming an angled recess in the molded article having an upper surface provided by the angled surface of the second shut-off member and provided at a sufficiently flat angle relative to vertical by the angled surface of the shut-off member to obscure the interface between the first resin and the third resin from an occupant of the vehicle interior.

* * * * *